June 28, 1938.  G. A. JOSEPHSON  2,122,319
METER READING RECORDER
Filed Nov. 30, 1936   2 Sheets-Sheet 1
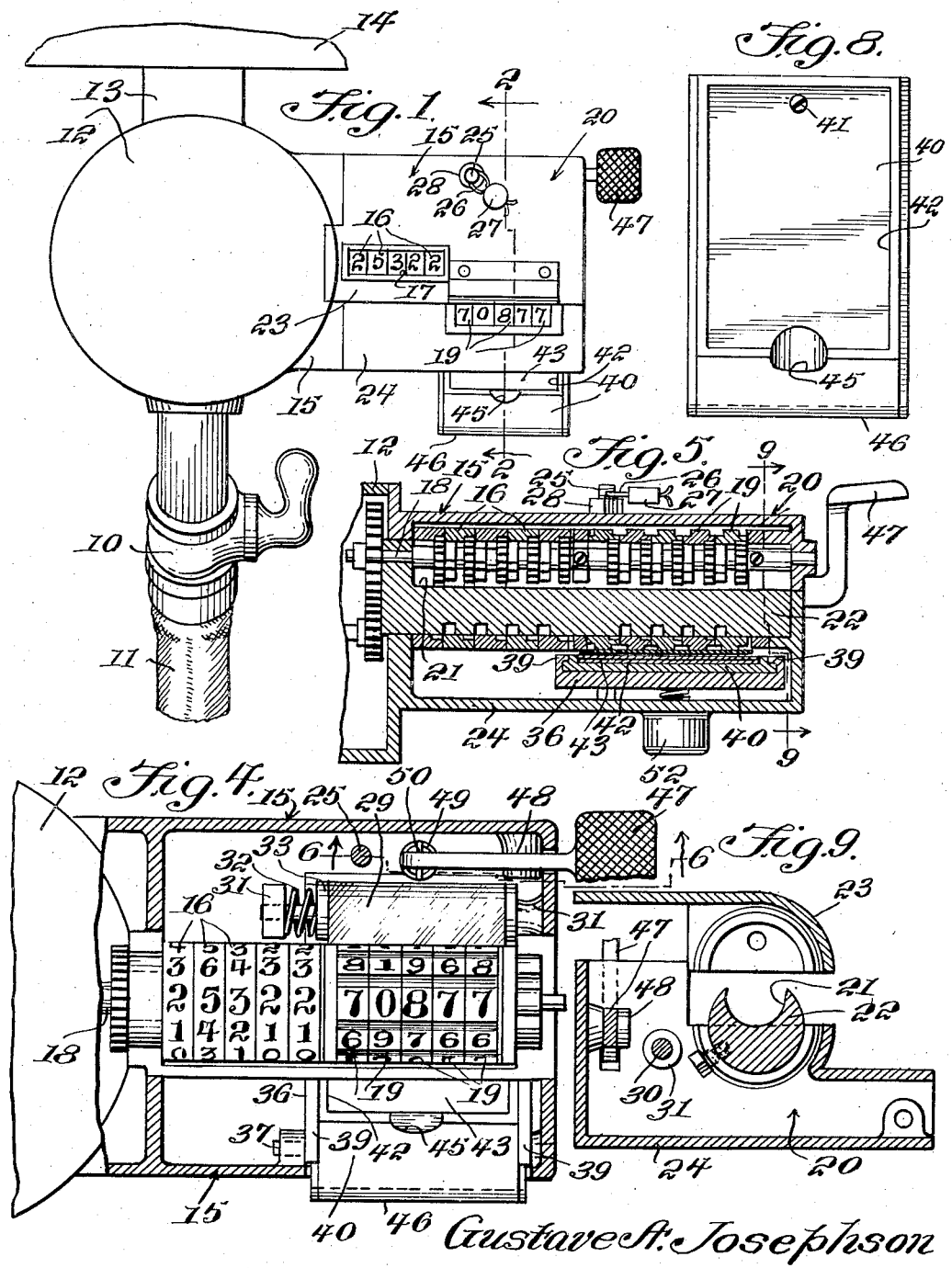
Gustave A. Josephson
INVENTOR
BY Victor J. Evans & Co.
ATTORNEYS
WITNESS J. T. L. Wright June 28, 1938.    G. A. JOSEPHSON    2,122,319
METER READING RECORDER
Filed Nov. 30, 1936    2 Sheets-Sheet 2
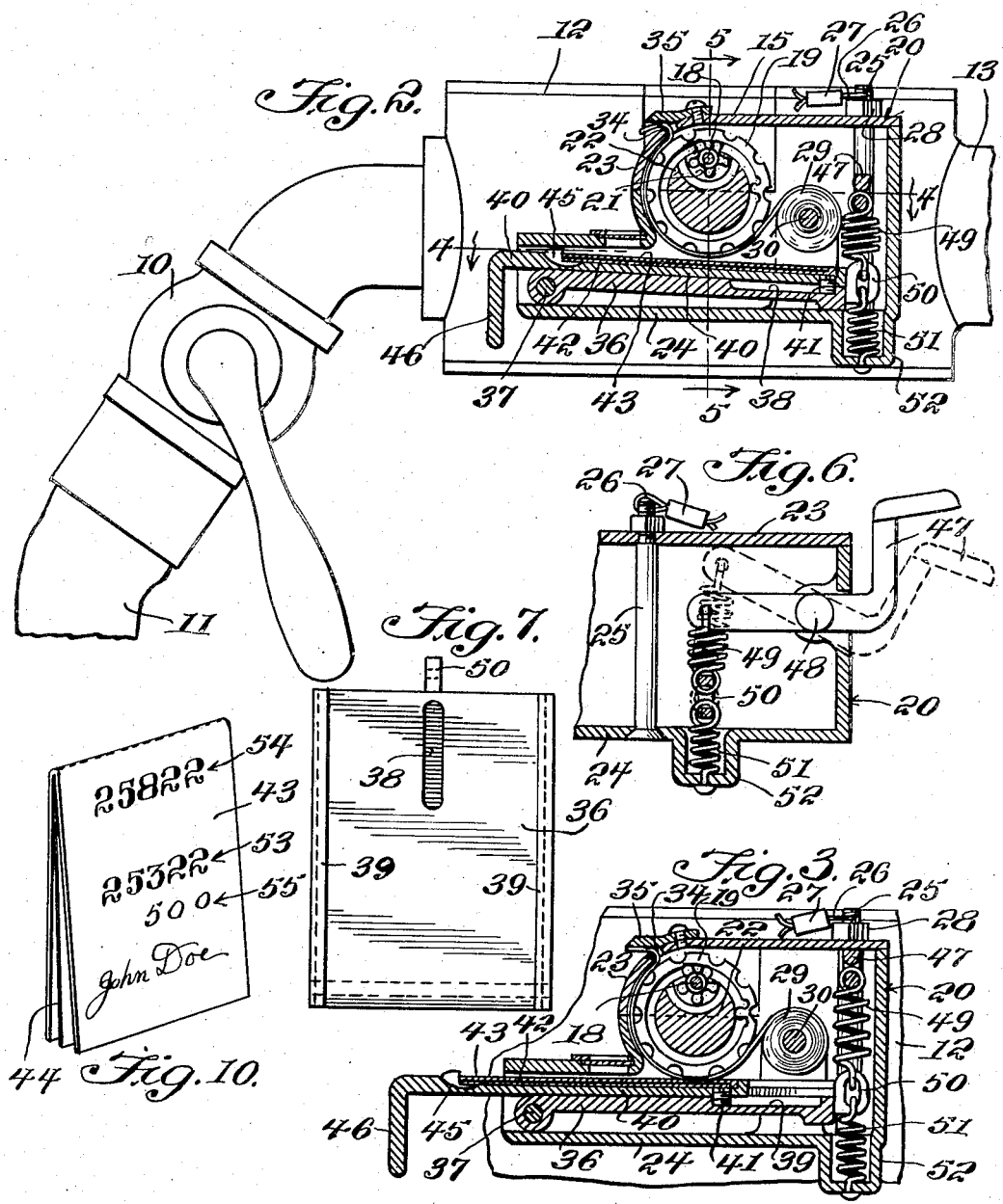

Patented June 28, 1938

2,122,319

UNITED STATES PATENT OFFICE 2,122,319

METER READING RECORDER

Gustave A. Josephson, Everett, Wash.

Application November 30, 1936, Serial No. 113,509

2 Claims. (Cl. 101—96)

This invention relates to meter reading recorders and has for an object to provide a device for printing on a sales ticket or other memorandum the initial reading of a meter and the final reading after a predetermined quantity of gasoline, for example has been dispensed, so that mistakes or even dishonest delivery from gasoline trucks to filling stations, will be positively prevented.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a meter reading recorder constructed in accordance with the invention and operating in connection with the delivery nozzle of a gasoline truck.

Figure 2 is a cross sectional view taken on the line 2—2 of Figure 1 showing one of the printing wheels, the carbon paper supply, and a pivoted carrier for the sales ticket at its inner limit of sliding movement to print the initial reading of the dispensing meter.

Figure 3 is a cross sectional view similar to Figure 2 but showing the carrier at the outer limit of movement in position to print the final reading of the dispensing meter above the initial reading as illustrated in Figure 10.

Figure 4 is a longitudinal sectional view taken on the line 4—4 of Figure 2 showing the conventional dispensing meter and the printing meter on the same shaft therewith, the latter meter having the numerals of its counting wheels advanced an angular distance of 180 degrees from the similar numerals of the counting wheels of the dispensing meter.

Figure 5 is a cross sectional view taken on the line 5—5 of Figure 2.

Figure 6 is a detail cross sectional view taken on the line 6—6 of Figure 4 showing the operating key.

Figure 7 is a plan view of the pivoted support for the ticket carrier.

Figure 8 is a plan view showing the ticket carrier and support therefor assembled.

Figure 9 is a cross sectional view taken on the line 9—9 of Figure 5 showing the two-piece housing and barrel for mounting the counting wheels and the printing wheels, the pivoted carrier assembly being removed from this view.

Figure 10 is a detail perspective view of one of the sales tickets bearing the initial and final meter readings of a delivery.

Referring now to the drawings in which like characters of reference designate similar parts in the various views, 10 designates the valve controlled nozzle, 11 the pipe which leads to underground storage tanks at a filling station, 12 the meter, 13 the outlet pipe, and 14 the tank, of a conventional gasoline truck. Ordinarily the meter 12 is provided with a lateral casing 15 in which the counting wheels 16 are mounted and are displayed through a sight opening 17.

In carrying out the invention the gear driven shaft 18 of the counting mechanism is provided with a duplicate set of counting wheels 19, hereinafter called printing wheels, which are housed within an extension 20 of the conventional counting wheel casing 15 and are arranged with their numerals advanced at an angular direction of about 180 degrees relatively to the numerals of the conventional counting wheels 16 so that while the latter are read through the top of the casing 15 the corresponding numerals of the former will be disposed at the bottom of the casing in printing position as will presently appear.

Both sets of conventional gears of the counting and printing wheels are housed within an arcuate pocket 21, best shown in Figure 9, formed in a stationary barrel 22 that extends from end to end of the extended casing 15—20. The extended casing may be formed of two parts 23 and 24, best shown in Figures 1 and 9 both parts being connected together by a single securing bolt 25 which extends exteriorly of the upper part 23 and is provided with a wire loop 26 and with a seal 27 to anchor the nut 28 of the bolt in position and also to prevent tampering with the counting mechanism.

As best shown in Figures 2, 3 and 4, a roll of carbon paper 29, is mounted on a shaft 30 the ends of which are journaled in suitable bearings 31 in the casing 20 and the shaft is tensioned against too free rotation by a spring 32 that is mounted on the projecting end of the shaft and confined under tension between an abutment disc 33 on the shaft and the adjacent bearing 31, as best shown in Figure 4.

The web of the carbon paper is trained underneath the printing wheels 19 as best shown in Figure 3 and is carried upwardly across the front of the printing wheels and then directed outwardly through a slot 34 in the upper section 23 of the casing. The free end is engaged underneath a shear 35 that projects forwardly from the casing and permits of a new surface of the web being disposed underneath the printing wheels and the used portion withdrawn and severed as often as may be required.

A supporting plate 36 is pivoted at the forward end upon a pivot pin 37, best shown in Figures 2 and 3. The plate extends rearwardly underneath the printing wheels and is provided centrally in the top surface near the rear end with a longitudinal guide slot 38 best shown in Figure 7. The edges of the plate are turned over the top face of the plate to provide guide flanges 39 in which the side edges of a sales ticket carrier are slidably received as best shown in Figure 8.

The carrier 40 is provided at the inner end with a guide screw 41 which is engaged in the guide slot 38 of the supporting plate and limits sliding movement of the carrier by contact with the opposite end walls of the slot as will be understood. The carrier is provided with a substantially oblong countersink 42 to receive therein a sales ticket 43, best shown in Figure 10, and comprising two folded leaves between which is interleaved a sheet of carbon paper 44 to provide an original and duplicate of the sales transaction. The carrier is provided with a notch 45 which permits the operator to insert a finger underneath the sales ticket to effect easy application of the sales ticket to the carrier and removal of the sales ticket from the carrier. The carrier is provided at the front end with a downturned grip 46 which permits the carrier being slid manually to either limit of its movement on the pivoted supporting plate 36.

A key 47, best shown in Figure 6, is pivotally mounted on a lug 48 best shown in Figure 4 and the inner end of the key is equipped with a depending helical spring 49 which is engaged in an eye 50, best shown in Figure 3, that is formed integral with the rear edge of the supporting plate 36. When the key is depressed the spring forms a yielding connection to lift the rear end of the supporting plate and thereby rock the carrier against the printing wheels. A spring 51 depends from the eye 50 and is secured in a well 52 on the bottom of the casing. This spring returns the pivoted supporting plate and the carrier to neutral position after each printing operation.

In operation the vendor or truck driver withdraws the carrier 40 by pulling outwardly upon the grip 46 and inserts a sales ticket 43 in the countersink 42 of the carrier. The carrier is now pushed inwardly to its inner limit of movement to dispose the center of the sales ticket underneath the printing wheels 19. The key 47 is now depressed to rock the supporting plate 36 and carrier 40 upwardly as a unit and the web of carbon paper impinges against the printing wheels and prints the total number displayed by the printing wheels and corresponding to the last sale made, on the sales ticket, as shown at 53 in Figure 10. The key is now released and the order of the filling station owner is dispensed into the underground tanks in the usual manner. The total quantity dispensed will be indicated by the conventional counting wheels 16, shown in Figure 1. After the measured quantity has been dispensed the valve 18 is closed. The printing wheels 19 will be moved with the counting wheels 16 to count a like number of gallons of gasoline and will display their numerals at the bottom of the wheel in printing position above the sales ticket. The vendor now grasps the grip 46 and pulls the carrier to its outer limit of movement on the supporting plate to dispose the inner end portion of the sales ticket underneath the printing wheels.

The key 47 is now depressed to elevate the carrier sufficiently to cause the printing wheels to print the new total near the top of the sales ticket as indicated at 54 in Figure 10. The sales ticket may now be removed and it will be an easy matter for the filling station owner to subtract the initial reading from the reading last printed, as indicated at 55 in Figure 10 to make sure that he has received the precise quantity of gasoline which he ordered.

From the above description it is thought that the construction and operation of the invention will be fully understood without further explanation.

What is claimed is:

1. The combination with a shaft, of printing wheels on the shaft, a carbon paper supply trained over the printing wheels, a supporting plate pivoted at one end below the printing wheels, a sales ticket carrying plate mounted for limited sliding movement on the supporting plate, a pivoted key connected with the supporting plate for rocking the plate toward the printing wheels to effect a recording of the reading of the printing wheels on the sales ticket, and means for returning the supporting plate to neutral position after each actuation.

2. The combination with a shaft, of printing wheels on said shaft, a carbon paper supply trained over the printing wheels, a supporting plate pivoted at one end below the printing wheels, guide means on the plate, a sales ticket carrier plate confined to limited sliding movement on the supporting plate by said guide means whereby a predetermined portion of the sales ticket may be disposed to receive a specific recording of the reading of the printing wheels, and a spring controlled key connected to the supporting plate for rocking the plate to operative position.

GUSTAVE A. JOSEPHSON.